United States Patent [19]

Siol et al.

[11] Patent Number: 4,539,361
[45] Date of Patent: Sep. 3, 1985

[54] METHOD FOR MAKING POLYMODAL AQUEOUS SYNTHETIC RESIN DISPERSIONS

[75] Inventors: Werner Siol, Darmstadt-Eberstadt; Wolfgang Klesse, Mainz; Norbert Suetterlin, Ober-Ramstadt; Hubert Rauch, Weiterstadt, all of Fed. Rep. of Germany

[73] Assignee: Röhm GmbH, Darmstadt, Fed. Rep. of Germany

[21] Appl. No.: 708,096

[22] Filed: Mar. 4, 1985

Related U.S. Application Data

[63] Continuation of Ser. No. 613,171, May 23, 1984, abandoned.

[30] Foreign Application Priority Data

May 27, 1983 [DE] Fed. Rep. of Germany ....... 3319340

[51] Int. Cl.$^3$ ............................................. C08J 3/06
[52] U.S. Cl. ..................................... 524/458; 524/460
[58] Field of Search ................................ 524/458, 460

[56] References Cited

U.S. PATENT DOCUMENTS

| | | | |
|---|---|---|---|
| 3,485,808 | 12/1969 | Wiesner | 526/329.2 |
| 3,509,237 | 4/1970 | Aubrey | 525/316 |
| 3,547,857 | 12/1970 | Murray | 524/458 |
| 4,046,839 | 9/1977 | Papetti | 525/316 |
| 4,245,070 | 1/1981 | Kemp | 526/82 |
| 4,254,004 | 3/1981 | Abbey | 260/29.6 R |
| 4,273,895 | 6/1981 | Minematsu | 525/316 |
| 4,418,183 | 11/1983 | Chiang | 524/460 |

FOREIGN PATENT DOCUMENTS

| | | |
|---|---|---|
| 2837992 | 3/1980 | Fed. Rep. of Germany . |
| 2931127 | 2/1981 | Fed. Rep. of Germany . |
| 2344579 | 10/1977 | France . |

*Primary Examiner*—Paul R. Michl
*Attorney, Agent, or Firm*—Curtis, Morris & Safford

[57] ABSTRACT

A method for making an aqueous polymodal synthetic resin dispersion by the emulsion polymerization of an ethylenically unsaturated monomer difficultly soluble in water, or a mixture of such monomers forming a polymer which is water insoluble under the conditions of polymerization, in an aqueous phase containing an emulsifier and a water soluble polymerization initiator, which method comprises adding a seed latex to the polymerization mixture in the course of the emulsion polymerization before more than 40 weight percent of said monomers have been polymerized, the particles of said seed latex being smaller by a factor ranging from 2 to 15 than are particles already formed by emulsion polymerization, the amount by weight of the particles in the seed latex being not greater than 10 percent by weight of the monomers and the ratio by weight of particles of said seed latex to the weight of the monomers already polymerized being from 1:4 to 1:500.

2 Claims, No Drawings

METHOD FOR MAKING POLYMODAL AQUEOUS SYNTHETIC RESIN DISPERSIONS

This application is a continuation of application Ser. No. 613,171 filed May 23, 1984 now abandoned.

The present invention relates to a method for making polymodal (including bimodal) synthetic resin dispersions.

Polymodal dispersions are dispersions wherein the particles are of different sizes, with several distinct maxima in the particle size distribution curve. Dispersions with two such maxima are bimodal and those with more than two maxima are polymodal. Compared with dispersions having only one particle size maximum, bimodal and other polymodal dispersions have a lower viscosity, exhibit better flowability in film formation, and give films possessing improved water resistance.

According to published German patent application DOS No. 29 31 127, bimodal dispersions can be prepared by mixing dispersions having different average particle sizes.

Another approach is to add, in the second stage of a two stage emulsion polymerization process, an additional amount of emulsifying agent sufficient to result in the formation of new particles which do not grow to a size as large as the particles originally formed and which, thus, form a second maximum in the distribution curve. The processes of published German patent application DOS Nos. 28 37 992 and 29 31 127 and of U.S. Pat. No. 4,254,004 are based on this principle. However, it is difficult to obtain reproducible results with these processes because the properties of the dispersion depend markedly on the number of particles formed in the second stage. That number depends, in a manner that is difficult to determine, on a number of factors.

According to French patent No. 2,344,579, a "microsuspension" of polyvinyl chloride particles exhibiting more than two particle size maxima is obtained by mixing a previously prepared "microsuspension" with two further previously prepared "microsuspensions" or dispersions, at least one of which contains an organically soluble initiator incorporated in its particles, and by adding more monomer in the absence of further initiators. The particles incorporating the initiator then continue to grow until the desired high solids content is reached, while the size of the particles free of initiator remains nearly the same. The preparation of such initiator containing "microsuspensions" differs from that of conventional emulsion polymerization in that the polymerization time is much longer and relatively coarse particles are formed which will settle unless they are kept in the dispersed state by agitation. The products obtained by this process can be used as substitutes for aqueous synthetic resin dispersions only in exceptional cases.

Published German patent application No. P 31 47 008 relates to a process for the preparation of highly concentrated bimodal or polymodal synthetic resin dispersions wherein at least two latices containing synthetic resin particles of different particle sizes are mixed and monomers are polymerized in the presence of the mixture until the solids content is greater than 58 weight percent. In the practice of this process, the synthetic resins contained in the mixture of previously prepared latices always amount to more than half of the synthetic resin contained in the final product, and usually to from 60 to 70 weight percent. For this reason, relatively large amounts are needed of the previously prepared latices, at least one of which must be stocked in sufficient quantity whereas the other can be prepared in a preceding process step. In this process, control of the size of the finer latex particles is possible only within certain limits.

The object of the present invention is to provide an improved process for the preparation of polymodal synthetic resin dispersions by the emulsion polymerization of unsaturated monomers in an aqueous phase containing an initiator and an emulsifier, with addition of a seed latex in the course of polymerization. This improved process should make it possible to reduce the need for a previously prepared seed latex and reliably to secure reproducibility of the particle size distribution, thus to obtain polymodal synthetic resin dispersions with constant, uniform end use properties. The synthetic resin dispersions prepared according to the method of the invention comprise at least two particle families of different average particle size, the largest particle family having an average diameter of 0.6 micron or less and the average particle size of the next smaller particle family being at most two thirds of the average particle size of the largest particle family.

In accordance with the invention, this object is achieved by adding the seed latex before more than 40 weight percent of the monomers have been polymerized. Further, the seed latex particles are smaller by a factor ranging from 2 to 15 than are the particles already formed by emulsion polymerization. Finally, the amount of the synthetic resin particles in the seed latex is not greater than 10 percent by weight of the monomers, and the ratio of the weight of the particles to the weight of the monomers already polymerized ranges from 1:4 to 1:500.

The process of the invention permits the preparation of polymodal synthetic resin dispersions without major modification of the usual processes whereby conventional synthetic resin dispersions having only one maximum in the particle size distribution curve can be prepared. A polymodal particle size distribution is achieved solely through the one-time or repeated addition of relatively small amounts of a seed latex at an early stage of the emulsion polymerization. Compared with methods in which a second particle formation phase is initiated by renewed addition of emulsifier, the process of the invention is distinguished by more accurate reproducibility since the number of the additional seeds can be controlled very accurately through the amount of the seed latex. In contract to processes in which substantial amounts or different types of seed latices are added in the course of polymerization, the process of the invention requires very little seed latex of only only one type. The process of the invention therefore is both simple and reliably reproducible.

The monomers which are subjected to emulsion polymerization in accordance with the invention are difficulty soluble in water at least to a considerable extent, by which is meant a solubility of less than 10 weight percent, and preferably of less than 2 weight percent, at 20° C. The proportion of difficulty soluble monomers in the polymer must be sufficiently high for the emulsion polymer formed to be insoluble in the water phase, at least under the conditions of polymerization, and to precipitate in the form of dispersed latex particles. When mixtures of monomers are polymerized, they are preferably composed of at least 70 weight percent, and highly preferably of at least 90 weight percent, of difficultly soluble monomers.

Suitable monomers include the alkyl esters of acrylic acid and methacrylic acid having from 1 to 20 carbon atoms in the alkyl group, styrene and its homologs, vinyl esters of lower carboxylic acids, dienes, and lower alpha-olefins, for example. These will generally form the principal monomers representing more than 50 weight percent of the synthetic resin. Suitable modifying monomers which usually account for less than 50 weight percent of the synthetic resin are acrylonitrile and methacrylonitrile, acrylamide and methacrylamide as well as N-methylol compounds and N-methylol ethers thereof, hydroxyalkyl esters of acrylic acid and methacrylic acid, optionally quaternized aminoalkyl esters and aminoalkylamides of acrylic acid and methacrylic acid, unsaturated carboxylic acids such as acrylic acid and methacrylic acid, maleic, fumaric and itaconic acid, and the half esters of dibasic carboxylic acids, as well as maleic anhydride.

A preferred class of synthetic resins is formed predominantly, that is, to the extent of 70 percent or more, of alkyl esters of acrylic acid and/or methacrylic acid or mixtures thereof and of styrene. The resins preferably contain a small amount of an alpha, beta-unsaturated carboxylic acid.

The seed latex is formed by an aqueous dispersion of synthetic resin particles free of radical forming initiators which are smaller by a factor ranging from 2 to 15 than the particles of the emulsion polymer at the time the seed latex is added. The seed latex particles have an average particle size ranging from 0.01 to 0.2 micron, for example, and preferably from 0.02 to 0.1 micron. The average particle size is the weight average of the particle diameter, as determined by the method of H. Lange, Kolloid-Zeitschrift and Zeitschrift für Polymere 223, 24 (1968), for example. A modern method of measurement is based on measurement of the variations in scattered light due to the Brownian movement of the latex particles in a laser beam, generally called photon correlation spectroscopy.

The seed latex is prepared conventionally by emulsion polymerization in an aqueous phase containing an emulsifier. By the use of an emulsifier concentration close to or slightly above the critical micelle concentration, a very large number of small latex seeds is formed, which seeds, through appropriate monomer addition, are allowed to grow to a particle size in the above range. The monomers from which the seed latex is formed may be the same as those used in the emulsion polymerization in accordance with the invention. However, other monomers, selected by the criteria set forth above with respect to the aforesaid monomers, may also be used.

The seed latex may have a polymer content ranging from 20 to 50, and preferably from 30 to 40, percent by weight. Lower polymer contents increase the amounts required to be used: higher polymer contents are detrimental because of high viscosity and because of stabilization problems during preparation and storage. As a rule, the seed latex can be stored for an extended period of time and may be kept on hand for a great many production batches of the polymodal synthetic resin dispersion.

An important objective of the invention is to minimize the need for a seed latex. The earlier during the emulsion polymerization the seed latex is added, the less seed latex will be required. The seed latex may be added as soon as the average particle size of the emulsion polymer being formed is twice the average particle size of the seed latex. Seed latex should not be added after 40 weight percent of the monomers have been converted during the emulsion polymerization. The preferred time of addition is between a monomer conversion of 2 and 30 weight percent. The amount of seed latex to be added will depend on the amount of emulsion polymer already formed at the time of such addition, or rather at the time at which such addition is started. (The amount of the emulsion polymer can be equated with sufficient accuracy with the amount of the monomers already charged.) The weight ratio between the synthetic resin particles of the seed latex and of the emulsion polymer should range from 1:4 to 1:500 parts by weight. The weight ratio preferably ranges from 1:20 to 1:200 parts by weight. The greater the difference in size between the seed latex particles and the emulsion polymer particles already formed, and the earlier the addition of seed latex is started, the smaller that ratio can be. From the weight ratio indicated, it is seen that the amount of the seed latex should not be greater than 10 percent, by weight of the total amount of the monomers. The amount of the seed latex preferably is less than 5 weight percent, and highly preferably less than 2 weight percent, of the amount of the monomers. The seed latex may be added all at once or in several portions, or more or less continuously over the conversion period indicated.

During polymerization of the monomers, the seed latex particles continue to grow along with the particles of the emulsion polymer. However, particles of different sizes do not grow exactly at the same rate. In the final product, the particles having the larger diameter account for the major portion of the weight of the dispersed synthetic resin, preferably from 60 to 95 weight percent, while the small particles predominate numerically.

The aqueous phase initially consists of the amount of water charged, in which emulsion polymerization is started, and is later augmented by the amount of water introduced with the seed latex and, if the monomers are used in the form of an aqueous emulsion, by the water content of the latter.

The amount of the water phase will depend on the desired solids content of the finished dispersion. The monomers may be added in the form of a 30 to 80 weight percent emulsion. When highly concentrated dispersions with solids contents greater than 65 percent are prepared, the monomers are preferably used in anhydrous form or at most with a small amount of water dissolved or emulsified therein. In that case, the amount of the aqueous phase is preferably limited to less than 70, and more particularly to from 40 to 60, parts by weight per 100 parts by weight of the monomers.

The aqueous phase in which the monomers polymerize contains a dissolved emulsifier and a dissolved initiator. The emulsifier may be a single surface active substance or a mixture of several such substances.

The emulsifier may be charged to the water phase at the start. Additional amounts of emulsifier may be introduced with the monomer emulsion.

Optionally, an emulsifier may be dissolved in the monomers, or an aqueous emulsifier solution may be dispersed in them. As a rule, no new particles should form during the emulsion polymerization and none will form if the amount of emulsifier optionally added is chosen and is metered in a manner such that no free emulsifier, that is no emulsifier not adsorbed on the particle surface, is present.

The seed latex may contain the anionic, cationic, or nonionic low molecular weight emulsifiers of a surfactant nature which are commonly used with synthetic resin dispersions, or compatible mixtures thereof, in the usual amounts. The emulsifier systems of the aqueous phase and of the seed latex must, of course, be compatible with each other, which in case of doubt should be ascertained in advance. As a rule, anionic emulsifiers are compatible with one another and with nonionic emulsifiers. This is true also of cationic emulsifiers, whereas anionic and cationic emulsifiers usually are not compatible with one another. This should be borne in mind also when further emulsifier is added. The concentration of ionic emulsifiers in the final product preferably ranges from 0.01 to 2 percent by weight of the water phase.

The emulsifiers which are used alone or in admixture are those which are commonly used in emulsion polymerization and are composed of a hydrophilic and a hydrophobic molecular portion. Their molecular weights usually are under 1,000. Water soluble polymers having higher molecular weights are occasionally used concurrently as protective colloids.

Commonly used emulsifiers contain long chain alkyl groups having from 8 to 22 carbon atoms, or aryl groups, and particularly alkyl substituted aryl groups such as nonylphenol or triisobutylphenol groups, as the hydrophobic molecular portion, and polyglycol ether groups composed of from 3 to 100 ethylene oxide groups or propylene oxide groups as nonionic hydrophilic groups, or sulfonic acid groups, sulfuric acid half ester groups linked to polyglycol ether groups, phosphonic acid groups, or carboxyl groups as anionic groups, or quaternary ammonium salt groups as cationic groups. The products of addition of from 3 to 100 moles of ethylene oxide to nonylphenol or triisobutylphenol, their sulfuric acid half esters, or their phosphoric acid partial esters are typical of these kinds of emulsifiers.

The concentration of the emulsifiers in the aqueous phase should only be high enough for the emulsifiers to be bound completely to the surface of the latex particles so that no free micelles are present which might form the seeds of new particles. As a rule, from 0.01 to 2 percent of emulsifier, by weight of the aqueous phase, should be present during the polymerization. On completion of polymerization, nonionic emulsifiers are often added.

The preparation of genuine synthetic resin dispersions possessing the end use properties which are characteristic of these products requires that the polymerization be initiated by free radicals in the aqueous phase. The latter should therefore contain a dissolved initiator which decomposes to yield free radicals under the conditions of polymerization. Initiators are classed as thermal and redox initiators. The first of these classes comprises water soluble peroxygen compounds such as an alkali metal or ammonium persulfate, or water soluble azo compounds such as azo-bis-cyanovaleric acid or its salts. They decompose at 50° to 100° C., and more particularly at 70° to 90° C., to form free radicals initiating polymerization. Redox initiators are formed of an oxidizing component, such as an alkali metal or ammonium persulfate or hydrogen peroxide, and a reducing component, such as hydrogen sulfite or a tertiary aromatic amine. The initiator is preferably used in an amount ranging from 0.01 to 0.5 percent by weight of the monomers.

The emulsion polymerization may be initiated in the manner described in connection with the preparation of the seed latex, with fresh latex seeds then being formed. However, it is also possible and often preferred to introduce a small amount of the seed latex into the initially charged water phase even before the start of emulsion polymerization. This method offers the advantage that the numerical ratio between the large particle and the small particle fractions of the emulsion polymer can be predetermined with a high degree of accuracy.

The monomers, as such or in the form of an aqueous emulsion, are added in the course of the polymerization, gradually and in keeping with the conversion, under polymerization conditions in such a way that there will be no accumulation of large amounts of unconverted monomers. Uniform addition of the monomers over a period from 0.5 to 5 hours with stirring usually is advisable. The heat of polymerization evolved can be removed through the wall of the vessel by cooling.

The polymerization temperature is based on the decomposition characteristics of the initiator and is held at the desired level by cooling. When thermally decomposing initiators are used, the polymerization temperature will usually range from 60° to 90° C. Redox initiator systems are effective primarily in the range from 20° to 60° C. Vigorous stirring during emulsion polmerization is advisable.

As soon as the latex particles have grown to a size bearing the desired relation to the size of the seed latex, addition of the latter is begun. The seed latex is preferably added all at once, but it may also be added over an extended period of time or in several portions. However, addition of the seed latex should be completed before more than 40 weight percent of the monomers have been added and polymerized. The monomer feed may, but need not, be interrupted as the seed latex is added. Polymerization is continued unchanged after the seed latex addition. Monomer addition is terminated before the average particle diameter of the largest particle family is 0.6 micron. On completion of polymerization, stirring is preferably continued for a few hours under polymerization conditions. This may be followed by the steps usually taken for the removal of residual monomers, for restabilization by the addition of further emulsifier, or for pH adjustment.

Polymodal dispersions higher than bimodal will be formed by the process of the invention when the seed latex is added at two or more distinctly separate times, or when a bimodal or polymodal dispersion is used as the seed latex.

A better understanding of the present invention and of its many advantages will be had by referring to the following specific examples, given by way of illustration.

For use in these Examples, a seed latex was prepared as follows.

In a stainless steel reaction vessel having a capacity of 100 liters and equipped with a reflux condenser, stirrer, and feed vessel, 0.056 kg of ammonium persulfate and 0.56 kg of an emulsifier consisting of a reaction product of triisobutylphenol and 7 moles of ethylene oxide which has been sulfated and converted to the sodium salt are dissolved at 80° C. in 34.2 kg of distilled water. An emulsion previously prepared from 2.772 kg of methyl methacrylate, 3.168 kg of butyl acrylate, 0.24 kg of methacrylic acid, 0.021 kg of the above emulsifier, and 6 kg of distilled water is added dropwise to this solution at 80° C. within 60 minutes, with stirring. An emulsion formed of 8.316 kg of methyl methacrylate, 9.504 kg of butyl acrylate, 0.063 kg of the above emulsifier, 0.028 kg of the above initiator, and 18 kg of distilled water is then metered in over a period of 3 hours. On completion of this addition, the batch is maintained at 80° C. for 2 hours and then cooled to room temperature.

A coagulate free dispersion having a solids content of 29.5%, a pH of 2.5, a viscosity of 43 mPa.sec, and a particle size of 0.044 micron is so obtained.

The particle diameters given here and in the Examples which follow for unimodal dispersions are average values determined by a special laser nephelometric method with due regard to Brownian molecular movement. This method of measurement is described in a publication of Coulter Electronics Ltd. (1979) describing the Coulter "Nano-Sizer" apparatus.

EXAMPLE 1

0.96 g of ammonium persulfate and 0.1 g of an emulsifier consisting of a reaction product of triisobutylphenol and 7 moles ethylene oxide which has been sulfated and converted to the sodium salt are dissolved in 320 g of distilled water in a 2-liter Witt jar equipped with a reflux condenser, stirrer, and feed vessel. An emulsion previously prepared from 828 g of butyl methacrylate, 354 g of butyl acrylate, 18 g of methacrylic acid, 10 g of the above emulsifier, 0.65 g of the above initiator, and 490 g of distilled water is added dropwise to this solution at 80° C. over a period of 4 hours, with stirring. 10 minutes after the start of this addition, 2 g of a 25% $NH_3$ solution are added to the dispersion and, within 10 minutes, 3 g of the seed latex are added, both without interruption of the emulsion addition. On completion of the addition, the batch is maintained at 80° C. for 2 hours and then cooled to room temperature.

A coagulate free dispersion having a solids content of 59.9%, a pH of 5.8, and a viscosity of 555 mPa.sec is so obtained.

With regard to the particle sizes, see Table I at the end of these Examples.

EXAMPLE 2

0.042 kg of ammonium persulfate and 0.0028 kg of an emulsifier consisting of a reaction product of triisobutylphenol and 7 moles of ethylene oxide which has been sulfated and converted to the sodium salt are dissolved at 80° C. in 8.7 kg distilled water in a stainless steel reaction vessel having a capacity of 100 liters and equipped with a reflux condenser, stirrer, and feed vessel. An emulsion previously prepared from 35.88 kg of butyl methacrylate, 15.34 kg of butyl acrylate, 0.78 kg of methacrylic acid, 0.42 kg of the above emulsifier, 0.028 kg of the above initiator, and 16.7 kg of distilled water is added dropwise to this solution over a period of 5 hours, with stirring. 55 minutes after the start of this addition, 0.080 kg of a 25% $NH_3$ solution is added to the dispersion and, within 10 minutes, 0.80 kg of the seed latex is also added, without interruption of the emulsion addition. On completion of the addition, the batch is maintained at 80° C. for 2 hours and then cooled to room temperature.

A coagulate free dispersion having a solids content of about 67% and a viscosity of 2,000 mPa.sec is so obtained. With regard to the particle sizes, see Table I.

EXAMPLE 3

1.05 g of ammonium persulfate, 2 g of the seed latex, and 0.07 g of an emulsifier consisting of a reaction product of triisobutylphenol and 7 moles of ethylene oxide which has been sulfated and converted to the sodium salt are dissolved in 650 g of distilled water in a polymerization vessel equipped as described in Example 1. A monomer/emulsifier mixture previously prepared from 897 g of butyl methacrylate, 383.5 g of butyl acrylate, 19.5 g of methacrylic acid, and 10.5 g of the above emulsifier is added dropwise to this solution at 80° C. over a period of 4 hours, with stirring. 60 minutes after the start of this addition, 2 g of a 25% $NH_3$ solution are added to the dispersion and, within 10 minutes, 100 g of the finely divided seed latex are added, without interruption of the monomer addition. On completion of the latter, 0.7 g of the above initiator is added and the batch is maintained at 80° C. for 2 hours and then cooled to room temperature.

A coagulate free dispersion having a solids content of 64.8%, a pH of 7.5 and a viscosity of 1,100 mPa.sec is so obtained. With regard to particle sizes, see Table I.

Comparative Example with Seed Latex Addition after Polymerization of more than 40% of the Monomers 1.2 g of ammonium persulfate and 0.1 g of an emulsifier consisting of a reaction product of triisobutylphenol and 7 moles of ethylene oxide which has been sulfated and converted to the sodium salt are dissolved at 80° C. in 738 g of distilled water in a 2-liter Witt jar equipped with a reflux condenser, stirrer, and feed vessel. A monomer/emulsifier mixture previously prepared from 828 g of butyl methacrylate, 354 g of butyl acrylate, 18 g of methacrylic acid, and 12 g of the above emulsifier is added dropwise to this solution at 80° C. over a period of 4 hours, with stirring. 160 minutes after the start of this addition, 2 g of a 25% $NH_3$ solution are added to the dispersion and, within 10 minutes, 120 g of seed latex are added, without interruption of the monomer addition. On completion of the addition, 0.8 g of the above initiator is added and the batch is maintained at 80° C. for 2 hours and then cooled to room temperature.

A coagulate free dispersion having a solids content of 60.4%, a pH of 6.3, and a viscosity of 230 mPa.sec is so obtained.

Following Table I shows that, with regard to particle size, with this medhod an unsatisfactorily small amount of finely dispersed polymer is formed notwithstanding the use of more seed latex.

TABLE I

| Example No. | Particle size** of emulsion polymer upon addition of seed latex (micron) | Particle size distribution of bimodal dispersion* | | | |
|---|---|---|---|---|---|
| | | Finely dispersed portion | | Coarsely dispersed portion | |
| | | Amount (Wt. %) | Size (micron) | amount (Wt. %) | Size (micron) |
| 1 | 0.16 | 30 | 0.26 | 70 | 0.39 |
| 2 | 0.30 | 25 | 0,13 | 75 | 0.45 |
| 3 | 0.31 | 20 | 0.09 | 80 | 0.45 |
| Comparative | 0.42 | less 5 | 0.05-0.07 | more 95 | 0.47 |

TABLE I-continued

| | Particle size** of emulsion polymer upon addition of seed latex (micron) | Particle size distribution of bimodal dispersion* | | | |
|---|---|---|---|---|---|
| | | Finely dispersed portion | | Coarsely dispersed portion | |
| Example No. | | Amount (Wt. %) | Size (micron) | amount (Wt. %) | Size (micron) |
| example | | than | | than | |

*The particle size distribution was determined by the ultracentrifuge method of W. Scholten and H. Lange, Kolloidzeitschrift und Zeitschrift fur Polymere 250 (1972) 782
**Determined by photon correlation spectroscopy

EXAMPLE 4

0.12 g of ammonium persulfate and 0.16 g of an emulsifier consisting of a reaction product of triisobutylphenol and 7 moles ethylene oxide which has been sulfated and converted to the sodium salt and 2.3 g of the seed latex are dissolved in 235 g of distilled water in a 2-liter Witt jar equipped with a refulx condenser, stirrer, and feed vessel. An emulsion previously prepared from 828 g of butyl methacrylate, 354 g of butyl acrylate, 18 g of methacrylic acid, 12 g of the above emulsifier, 0.8 g of the above initiator, and 550 g of distilled water is added dropwise to this solution at 80° C. over a period of 4 hours, with stirring. 10 minutes after the start of this addition, 2 g of a 25% NH$_3$ solution are added to the dispersion and, within 5 minutes, 2.3 g of the seed latex are added, both without interruption of the emulsion addition. 30 minutes later a further amount of 23 g of the seed latex is added within 5 minutes. On completion of the emulsion addition, the batch is maintained at 80° C. for 2 hours and then cooled to room temperature.

A coagulate free dispersion having a solids content of 60.2 percent by weight, a pH of 5.8, and a viscosity of 650 mPa.sec is so obtained. 30% of the particles have a diameter of 0.135 micron, 13% of 0.23 micron and 57% of 0.45 micron, as determined by the ultracentrifuge method.

What is claimed is:

1. A method for making an aqueous synthetic resin dispersion comprising at least two particle families of different average particle size, the largest particle family having an average particle diameter of 0.6 micron or less and the average particle size of the next smaller particle family being at most two-thirds of the average particle size of the largest particle family, which method comprises (a) gradually adding an ethylenically unsaturated monomer difficultly soluble in water or a mixture of ethylenically unsaturated monomers forming a polymer which is insoluble under the conditions of polymerization, as such or in the form of an aqueous emulsion, to an aqueous phase containing an emulsifier and a water soluble polymerization initiator and having a temperature at which polymerization of said monomers is effected, whereby synthetic resin particles are formed;

(b) adding a seed latex containing synthetic resin particles to the polymerization mixture in the course of the polymerization after 2 weight percent, but before more than 40 weight percent, of said monomers have been converted, the particles of said seed latex being smaller by a factor ranging from 2 to 15 than are the particles already formed by the emulsion polymerization of step (a) (the size of the particles being calculated as average particle diameters), the amount by weight of the particles in the seed latex being not greater than 10 percent by weight of the monomers, the ratio by weight of particles of said seed latex to the weight of the monomers already added being from 1:4 to 1:500, and the amount of emulsifier used in step (a) being such that no free emulsifier is present in the polymerization mixture when said seed latex is added;

(c) continuing the monomer addition under emulsion polymerization conditions after the addition of said seed latex and terminating said monomer addition and emulsion polymerization before the average particle diameter of the largest particle family is larger than 0.6 micron.

2. A method as in claim 1 wherein said aqueous phase prior to the monomer addition contains an additional amount of said seed latex.

* * * * *